(12) United States Patent
Pirotte

(10) Patent No.: US 11,344,039 B2
(45) Date of Patent: May 31, 2022

(54) METHOD FOR ANTI-SPROUTING TUBER TREATMENT WITH REDUCED AMOUNT OF CIPC

(71) Applicant: ARYSTA LIFESCIENCE BENELUX SPRL, Seraing (BE)

(72) Inventor: Alan Pirotte, Houffalize (BE)

(73) Assignee: ARYSTA LIFESCIENCE BENELUX SPRL, Seraing (BE)

( * ) Notice: Subject to any disclaimer, the term of this patent is extended or adjusted under 35 U.S.C. 154(b) by 126 days.

(21) Appl. No.: 16/838,458

(22) Filed: Apr. 2, 2020

(65) Prior Publication Data

US 2020/0236959 A1 Jul. 30, 2020

Related U.S. Application Data

(62) Division of application No. 15/520,216, filed as application No. PCT/EP2015/074268 on Oct. 20, 2015, now Pat. No. 10,638,769.

(30) Foreign Application Priority Data

Oct. 20, 2014 (EP) .................................. 14189561

(51) Int. Cl.
| | | |
|---|---|---|
| A23B 7/154 | (2006.01) | |
| A01N 65/36 | (2009.01) | |
| A01N 27/00 | (2006.01) | |
| A23L 19/10 | (2016.01) | |
| A01N 25/04 | (2006.01) | |
| A01N 47/20 | (2006.01) | |
| A23L 3/3463 | (2006.01) | |

(52) U.S. Cl.
CPC .............. *A23B 7/154* (2013.01); *A01N 25/04* (2013.01); *A01N 27/00* (2013.01); *A01N 47/20* (2013.01); *A01N 65/36* (2013.01); *A23L 3/3463* (2013.01); *A23L 19/10* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 5,139,562 A | 8/1992 | Vaughn et al. | |
| 5,415,787 A | 5/1995 | Vlasblom | |
| 5,464,555 A | 11/1995 | Bayless | |
| 5,580,596 A | 12/1996 | Winkelmann et al. | |
| 5,622,912 A | 4/1997 | Riggle et al. | |
| 5,811,372 A | 9/1998 | Riggle et al. | |
| 5,965,489 A | 10/1999 | Forsythe et al. | |
| 6,001,773 A | 12/1999 | De Vries | |
| 6,403,536 B1 | 6/2002 | Forsythe et al. | |
| 6,723,364 B1 | 4/2004 | Bompeix et al. | |
| 8,207,090 B2 | 6/2012 | Sardo | |
| 8,329,618 B1 | 12/2012 | Schafer et al. | |
| 2004/0069720 A1 | 4/2004 | Clausen et al. | |
| 2005/0137090 A1 | 6/2005 | Sardo | |
| 2006/0276336 A1* | 12/2006 | Sardo | A01N 47/20 504/100 |
| 2008/0146444 A1 | 6/2008 | Fabri et al. | |
| 2010/0298147 A1 | 11/2010 | Sardo | |
| 2010/0316738 A1 | 12/2010 | Jimenez et al. | |
| 2013/0183419 A1* | 7/2013 | Knowles | A01N 35/02 426/321 |

FOREIGN PATENT DOCUMENTS

| | | |
|---|---|---|
| CN | 1789398 | 8/2006 |
| EP | 1728429 | 7/2009 |
| EP | 2253208 | 2/2012 |
| GB | 1603047 | 11/1981 |
| RU | 2239320 C2 | 11/2004 |
| WO | 9210934 | 7/1992 |
| WO | 9848625 A1 | 11/1998 |
| WO | 0032063 | 6/2000 |
| WO | 2012031174 A2 | 3/2012 |
| WO | 2012037294 A2 | 3/2012 |

OTHER PUBLICATIONS

Beveridge, J. et al.; "The assessment of some volatile organic compounds as sprout suppressants for eare and seed potatoes"; Potato Research, vol. 24, Issue No. 1; 1981; pp. 61-76.
European Search Report for European Application No. 14189561.5; Search Completed Mar. 20, 2015; dated Apr. 1, 2015; 6 pages.
Vaughn, S.F. et al., "Volatile Monoterpenes Inhibit Potato Tuber Sprouting," American Potato Journal, 1991, vol. 68, pp. 821-831.

\* cited by examiner

*Primary Examiner* — Dominic Lazaro
(74) *Attorney, Agent, or Firm* — Cantor Colburn LLP

(57) ABSTRACT

Described herein is a method for the anti-sprouting treatment of tubers, especially potatoes, by applying a composition including limonene and a composition including CIPC, preferably via fogging. Also described is the use of limonene as a replacement for CIPC in the anti-sprouting treatment of tubers. The disclosure provides limonene compositions suitable for application by fogging. Furthermore, the disclosure concerns tubers obtainable by any of these methods.

16 Claims, 5 Drawing Sheets

METHOD FOR ANTI-SPROUTING TUBER TREATMENT WITH REDUCED AMOUNT OF CIPC

CROSS-REFERENCE TO RELATED APPLICATIONS

This application is a Divisional of U.S. application Ser. No. 15/520,216, filed on Apr. 19, 2017, which is a § 317 of PCT/EP2015/074,268, filed on Oct. 20, 2015, which claims priority to application EP14189561.5, filed on Oct. 20, 2014, which are incorporated herein by reference in their entirety.

TECHNICAL FIELD

The invention pertains to the technical field of food storage, in particular the storage of tubers. More in particular in the treatment of tubers to inhibit or remove sprouts on tubers. The invention provides a natural alternative to the anti-germinating agents commonly used today. The invention is beneficial for the technical field of agriculture, in particular potato storage.

BACKGROUND

The storage of potatoes, and other tubers, is typically done at a temperature between 2 and 10° C. At this temperature the potato converts starch into sugar and stores the sugar in the potato leading to a sweeter taste and in the French fries test, the potato collars brown to fast when cooked (fry colour). This leads to a lower quality of potato. The cure to the build-up of sugar in the potato is to store the potatoes at a higher temperature, preferably around 15° C. a couple of weeks before the potatoes are put on the market. In this period the sugar level within the potato will drop, but the potato will start to produce sprouts or germs. Along with the sprout formation, the potato will start to produce toxic glycoalkoids, molecules that are not destroyed during cooking, making the potato unsellable. Some potato storages are not equipped with a climate control until and the temperature within the storage depends on the weather condition. If the temperature within the warehouse can't be kept low enough, the potatoes will start to sprout. To suppress sprouting, sprouting inhibitors are used.

The sprout inhibitor of choice over the last 50 years is 3-chlorophenylisopropylcarbamate (CIPC) also known as chlorpropham, CAS 101-21-3. CIPC brings the potato or tuber in a dormant state with very little sprout formation. CIPC is a solid at room temperature; this property causes CIPC to attach to potatoes and leaving residues on the treated potatoes for a long time after application. CIPC use in Europe is restricted to max. 36 g active ingredient per ton potatoes per year.

CIPC residue-levels are subjected to regulations. As part of the European Annex I inclusion under Directive EC/91/414 a Maximum Residue Level (MRL) of 10 mg/kg was set. Expectations are that the MRL level will continue to be lowered, demanding for alternative treatment of tubers, preferably potatoes. In addition, there is a growing bio-segment, which demands fresh produce absent of residues. Consequently, alternatives are sought to be able to lower CIPC use, meet residue level requirements, and keep efficacy.

U.S. Pat. No. 5,811,372 described a method for the anti-sprouting treatment of potatoes by the application of CIPC and a terpene by hot fogging. An efficacy test is included wherein a range of terpenes is tested in combination with CIPC. A good result was obtained for carvone. The combination of CIPC and limonene was reported as not effective and even worse than the application of CIPC alone. At 125 days after treatment, a combined use of 16.6 ppm CIPC with 16.6 ppm limonene showed 97% unsuitable for fresh pack use. Tubers having sprouts which on average are greater than 1 mm were considered unacceptable for fresh pack.

Apparently, limonene is not a candidate for CIPC replacement.

More recently, US 2006/0276336 (EP 1 728 429) described a method for the anti-sprouting treatment of tubers by application of CIPC and a terpene or an essential oil via hot fogging. The terpene of choice was carvone, eugenol or iso eugenol obtained from clove oil or mint oil. However, clove oil and its derivatives are likely to be cost-prohibitive, demanding a cheaper more economical alternative. In this document it is repeated that limonene in a combination with CIPC is not effective in inhibiting sprout formation. In the treatment of tubers, 20 grams per tonne of CIPC is used in combination with carvone or (iso)eugenol. Combinations of CIPC with limonene or jasmonene were disclosed as not providing positive results.

In WO 00/32063 a fog treatment method is disclosed using a liquid composition for the treatment of potatoes. One of the examples uses a 60 wt % limonene composition with 7 wt % non-ionic emulsifier and 33 wt % butyl acetate solvent. The treatment protocol consisted of 45 g/ton at the start of storage and 15 g/ton every 20 days, thereby delivering 165 g of active ingredient per ton of potatoes over a 6-month period. After a period of 5 months the limonene treated potatoes showed weight loss (4.5% vs 5.4%) and sprout growth (96.8% vs 100%; compared to 18% for CIPC) close to that observed for the untreated control. This disclosure presents limonene as unsuitable for sprout control in potatoes.

It is an objective of the present invention, to provide a solution to at least one of the problems mentioned above.

The invention aims to provide a composition for use as an anti-sprouting agent, capable of at least partially replacing CIPC as anti-sprouting agent for potatoes. The alternative should be cost effective. Preferably the alternative is renewable. It would be advantageous if the alternative could reduce the amount of residues of CIPC.

SUMMARY OF THE INVENTION

The invention provides in a natural alternative for CIPC, so that the amount of CIPC used in an anti-sprouting treatment can be reduced. The invention provides in a method of application that makes limonene effective in the inhibition of sprout formation, in particular as sprout-removal agent complementary to CIPC sprout suppression.

In a first aspect the invention provides in a method for an anti-sprouting treatment of tubers comprising the following steps:
  applying CIPC and limonene to said tubers; in a total amount of CIPC and limonene effective to at least partially suppress sprouting of said tubers and remove sprouts that have formed on said tubers, characterised in that, the ratio limonene weight over CIPC weight is higher than 4.

The application of CIPC will cause the tuber to go in a dormant state and in this state not many sprouts will be produced. The few sprouts that are formed will be destroyed by the application of limonene. It was found that by selection of the dose of limonene and the application interval, the dose of CIPC can be reduced. This is advantageous as CIPC residues on the treated tubers can be reduced.

In a second aspect the invention provides in the use of limonene as an anti-sprouting agent for the at least partial replacement of CIPC in the treatment of tubers.

By the term "anti-sprouting agent" as used in the present invention is meant, a chemical agent that is capable of suppressing and/or removing sprouts from a tuber, in particular a potato. CIPC is a sprout-suppressant. It has a systemic and preventive mode of action. Limonene was found to be effective as sprout removal agent. It has a curative action. It is not effective as sprout suppressant when applied prior to the appearance of sprouts. The amount selected needs to be effective to remove sprouts.

It was found that limonene can at least partially replace the preventive anti-sprouting agents CIPC and maleic hydrazide. When less CIPC is used on the tubers, more sprouts start to form, but when applied at regular intervals the limonene will remove the sprouts in an early stage of their development and will keep sprout formation suppressed.

In a third aspect the invention provides in treated tubers obtainable by a method according to an embodiment of the invention. These tubers are characterised in low levels of CIPC; in particular lower than 10 ppm.

DETAILED DESCRIPTION OF THE INVENTION

Figure 1:
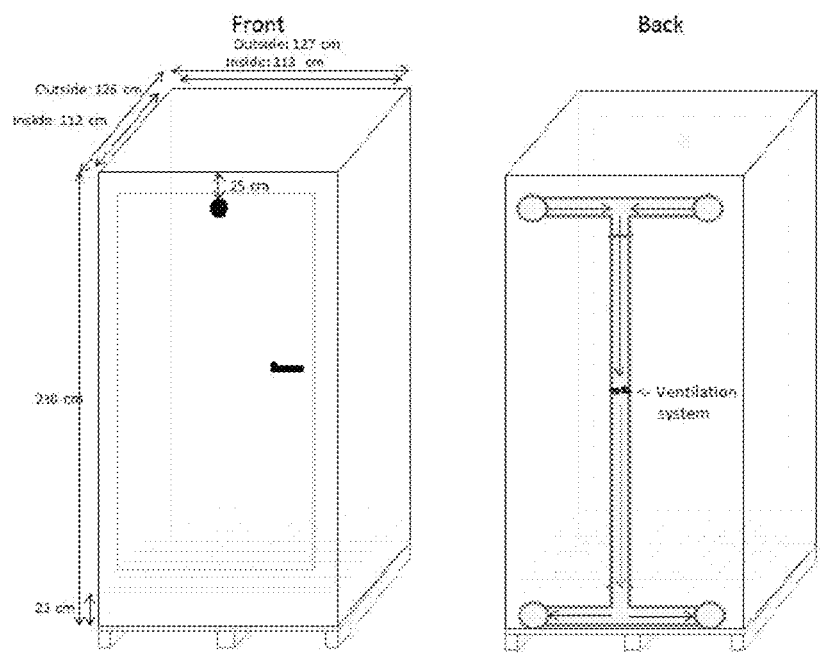
FIG. 1 provides a schematic representation of dimensions of the treatment cabins used in the fogging trials.

"About" as used herein referring to a measurable value such as a parameter, an amount, a temporal duration, and the like, is meant to encompass variations of 35+/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

The recitation of numerical ranges by endpoints includes all numbers and fractions subsumed within that range, as well as the recited endpoints.

The expression "% by weight" or "wt %" (weight percent), here and throughout the description unless otherwise defined, refers to the relative weight of the respective component based on the overall weight of the formulation.

As used herein, the term "tuber" refers to a modified plant structure that is enlarged to store nutrients for the plant to survive the winter or dry months. They provide energy and nutrients for regrowth and for asexual reproduction. In plants they can be found in potatoes (*Solanum tuberosum*), sweet potatoes (*Ipomoea batatas*), cassava (*Manihot esculenta*), yam (*Dioscorea*) and dahlia.

As used herein, the terms "sprout", "shoot" or "germ" are synonyms. The terms refer to the early growth of a plant from a bulb or a tuber.

As used herein, the terms "anti-sprouting" and "anti-germinative" refer to the ability to stop sprouts or germs on tubers from forming or growing.

In a first aspect the invention provides in a method for the anti-sprouting treatment of tubers. It comprises a CIPC and limonene treatment. The order of the steps can be changed. Preferably a CIPC treatment precedes a limonene treatment. CIPC can be applied neat or in the form of a formulated product. Limonene can be applied neat or in the form of a formulated product. Limonene is preferably applied in the form of orange oil, rich in limonene.

In particular the invention provides in a method for an anti-sprouting treatment of tubers comprising the following steps:

applying CIPC and limonene to said tubers; in a total amount of CIPC and limonene effective to at least partially suppress sprouting of said tubers and remove sprouts that have formed on said tubers, characterised in that, the ratio limonene weight over CIPC weight is higher than 4, preferably higher than 6, more preferably higher than 8, even more preferably higher than 9 and most preferably higher than 10.

For a combined use of CIPC and limonene, the CIPC will prevent sprouts from growing by means of a systemic mode of action whereas the limonene applied acts by the removal of sprouts from a sprout-bearing tuber by means of a curative mode of action.

In a preferred embodiment, limonene is present in the composition as the enantiomeric pure form of D-limonene, CAS: 5989-27-5. In another embodiment, limonene is present in the composition as the enantiomeric pure form of L-limonene, CAS: 5989-54-8. In yet another embodiment limonene is present as a racemic mixture, also known as dipentene, CAS: 138-86-3.

Limonene can be obtained via a synthetic route, or limonene can be extracted from a natural source. As the synthetic route is too costly in view of the material available from natural sources, most commercially available limonene is from a natural source. D-Limonene can be obtained commercially from citrus fruits through two primary methods: centrifugal separation or steam distillation.

In a preferred embodiment, the limonene is present in the form of an essential oil; meaning oil produced from a plant or a part of a plant. The presence of an essential oil makes the anti-sprouting agent more natural and uses sustainable resources in the production. Essential oils are often a side product of agriculture, and finding applications of this side product can generate a higher economic value out of growing a crop. Essential oils suitable to be used in the invention are citrus oil, orange oil, lemon oil, lime oil, grapefruit oil and tangerine oil.

In a preferred embodiment, limonene is present in the form of a composition comprising more than 50% 1-methyl-4-(1-methylethenyl)-cyclohexene as active ingredient, commonly known as limonene. In a preferred embodiment, the composition comprises more than 60%, preferably more than 70%, and most preferably more than 90 wt % of limonene relative to the total weight of the composition.

In a preferred embodiment said composition comprising limonene comprises orange oil. Orange oil consists of more than 90% of D-Limonene, an enantiomeric pure form of limonene. The limonene content of orange oil depends on the variety of oranges the oil comes from and depends on the region where the oranges are grown. Orange oil is classified by the FDA as "generally recognized as safe" and approved on the addition of orange oil to food. The price of orange oil is far less than the price of mint oil, clove oil or caraway oil, making orange oil the economically most favoured option.

In a more preferred embodiment the composition comprising limonene is only orange oil, without any additives, or without any solvent other than orange oil.

It was found that orange oil does not affect the taste of the treated tubers as does mint oil that contains menthol. It is the menthol that contributes to the mint flavour the treated potatoes get.

In a more preferred embodiment said orange oil is selected from the list of technical grade orange oil, CAS 94266-47-4; food grade orange oil, CAS 8028-48-6 or cold pressed orange oil. The person skilled in the art is familiar with orange oil and its characteristics from its listing as active substance (SANCO/12083/2013 rev 3, 2013) and the standard references ISO 3140:211 and the European Pharmacopoeia 5.0, 2005.

In a preferred embodiment, the limonene composition is in the form of a water emulsifiable composition (EC), comprising more than 50 wt %, 55 wt %, 56 wt %, 57, wt %, 58 wt %, 59 wt %, or more than 60 wt % limonene and an emulsifying surfactant. In a preferred embodiment, the composition comprises more than 65%, preferably more than 70%, and most preferably more than 71 wt % of limonene relative to the total weight of the composition. A composition most preferred typically has a limonene content of 71-72 wt % relative to the total weight of the composition. The high limonene content has the advantage that less volume of composition needs to be shipped and stored compared to a more diluted product.

Preferably the emulsifiable concentrate comprises at least 500 g/l limonene, preferably at least 550 g/l limonene, most preferably at least 600 g/l limonene, expressed as amount of active ingredient with 100% purity relative to the total volume of the composition.

In a preferred embodiment, the limonene composition is substantially solvent free; that is substantially free of water and any organic solvent, apart from the orange oil or limonene. By the term "substantially solvent free" as used in the present invention, is meant a composition with less than 10 wt % solvent based on the total weight of the composition. With the term "solvent" is meant, a substance in which another substance is dissolved, forming a solution.

In a preferred embodiment the limonene composition comprises less than 10 wt % solvent, preferably less than 5 wt % solvent, and most preferably is solvent-free, although traces, less than 0.1%, of solvent can't be excluded, all percentages are weight by weight. In a preferred embodiment the composition comprises less than 5% water and is most preferably water-free, although traces, less than 0.1%, of water can't be excluded, all percentages are weight by weight.

Preferably the limonene composition additionally comprises one or more surfactants. Preferably said one or more surfactants are a non-ionic and/or anionic surfactant.

Preferably the non-ionic surfactant is selected from the list sorbitan monolaurate, sorbitan monopalmitate, sorbitan sesquioleate, sorbitan trioleate, polyoxyethylene sorbitan monolaurate, polyoxyethylene sorbitan monostearate, polyethylene glycol monooleate, polyethylene glycol alkylate, polyoxyethylene alkyl ether, polyglycol diether, lauroyl diethanol amide, fatty acid iso-propanolamide, maltitol hydroxy fatty acid ether, alkylated polysaccharide, alkyl glucoside, sugar ester, alkoxylated alcohol, oleophillic glycerol monostearate, self-emulsifiable glycerol monostearate, polyglycerol monostearate, polyglycerol alkylate, fatty alcohol alkoxylate, sorbitan monooleate, polyethylene glycol monostearate, polyoxyethylene sorbitan monooleate, polyoxyethylene cetyl ether, polyoxyethylene sterol, polyoxyethylene lanolin, polyoxyethylene bees wax, or combinations thereof.

Preferably the anionic surfactant is selected from the list sodium stearate, potassium palmitate, sodium cetyl sulfate, sodium lauryl phosphate, sodium polyoxyethylene lauryl sulfate, triethanolamine palmitate, polyoxyethylene sodium lauryl phosphate, sodium N-acyl glutamate, or combinations thereof.

Preferably the non-ionic surfactant present in a composition according to the invention is a non-ionic polymeric surfactant. More preferable the polymeric surfactant is an alkoxylated alcohol, even more preferably a fatty alcohol alkoxylate, most preferably an ethoxylate and/or a propoxylated alcohol. Preferably the alkoxylated alcohol is an iso-tridecanol alkoxylate, more preferably an iso-tridecanol penta-ethoxylate.

The surfactant is preferably present in an amount of 5 to 40%, more preferably in 10 to 20%, most preferably 12-13%; all weight of surfactant by total weight of the composition.

By the term "fatty alcohol" as used herein, is meant a linear or branched alcohol with a carbon chain length of at least 4 carbon atoms, preferably at least 6, more preferably at least 8, even more preferably at least 10, most preferably at least 12. Preferably the fatty alcohol has a carbon chain length of below 22, more preferably below 20, most preferably below 18 carbon atoms. Preferably the alcohol is a primary alcohol. More preferably the alcohol is a primary alcohol with a carbon chain length of 4-22 carbon chain atoms, most preferably 8-14 carbon chain atoms.

In a preferred embodiment, the composition comprises a wetting agent, which helps to lower the surface tension of the emulsion formed after adding the composition to water to form a spray-mixture. This lower surface tension helps to coat a larger surface of the tubers with the composition.

However, the essentially water-free composition does not allow the wetting agents that are commonly used in the prior art, in particular a water-soluble anionic surfactant. These surfactants require water to form a stable solution, as their counter ion is commonly a calcium ion, an ammonium ion, a sodium ion or a potassium ion. Examples of these anionic surfactants include agents such as sodium stearate, potassium palmitate, sodium cetyl sulfate, sodium lauryl phosphate, sodium polyoxyethylene lauryl sulfate, triethanolamine palmitate, polyoxyethylene sodium lauryl phosphate, and sodium N-acyl glutamate; and combinations thereof.

The wetting agent in a composition according to the invention is preferably an anionic surfactant with as anionic part an alkylbenzene sulfonate, more preferably a dodecylbenzene sulfonate. The cationic counter ion is preferably chosen from the list of trietylammonium ion, triethanolammonium ion, tertrabutylammonium ion, or other tetra-alkylammonium ions; tetraphenylphosphonium ion or other tetra-alkylphosphonium ions; or a combination of a metal-ion and a crown ether; and combinations thereof.

In a preferred embodiment, the wetting agent is preferably an ethanolamine alkylbenzenesulfonate. In a preferred embodiment the wetting agent is triethanolammonium dodecylbenzene sulfonate, CAS: 27323-41-7. A combination of this anion and counter ion allows the wetting agent to be soluble in the composition without solvent other than the limonene. An emulsifiable composition of limonene and this type of surfactant in the absence of additional solvent, was found to have a good cold storage stability.

Preferably acceptable cold storage stability of a limonene composition according to the present invention is provided in a temperature range between −20° C. and 5° C., preferably between −10° C. and 4° C., more preferably between −5° C. and 3° C., most preferably between −4° C. and 0° C.

Cold storage stability was measured for compositions stored for a period of 7 days, conform to CIPAC MT 39.3: low temperature stability of liquid formulations. A sample is maintained at 0° C. for 1 h and the volume of any separated solid or oily matter is then recorded. Storage at 0° C. is continued for 7 days, any solid matter is settled by centrifuging and its volume recorded. Measurement methods are known to a person skilled in the art.

The wetting agent is preferably present in the emulsifiable composition in an amount of 5 to 25%, more preferably in 10 to 20%, most preferably 15-16%, expressed in weight percent surfactant by total weight of the composition.

In a preferred embodiment, the limonene composition comprises both a non-ionic and anionic surfactant. Most preferably a composition for use in the present invention comprises as surfactants a combination of an alkoxylated fatty alcohol and an ethanolamine alkylbenzenesulfonate.

In a preferred embodiment, the composition comprises an antioxidant for limonene. Preferably the antioxidant is chosen from the list diphenylamine, ethoxyquin, BHA which is a mixture of 3-t-butyl-4-hydroxyanisole and 2-t-butyl-4-hydroxyanisole, BHT corresponding to 2,6-di-tert-butyl-p-cresol, ascorbic acid, a tocopherol, a polyphenol, or combinations thereof.

The presence of an antioxidant may protect the limonene from oxidising. For instance, traces of oxygen can get into the composition or the headspace of the bottle after the bottle has been opened. This is advantageous as limonene oxides are suspected sensitizers.

The antioxidant is preferably present in less than 1%, more preferable less than 0.5%, most preferably less than 0.1%, all weight of anti-oxidant by weight of the total composition.

In a preferred embodiment the antioxidant is BHT or BHA. The composition preferably comprises less than 1% BHT or BHA %, more preferable less than 0.5% BHT or BHA %, most preferably less than 0.1% BHT or BHA %, all weight of anti-oxidant by weight of the total composition.

In another preferred embodiment, orange oil is used neat. This makes the limonene composition completely natural. Preferably said composition comprises at least 500 g/l limonene, preferably at least 600 g/l limonene, more preferably 700 g/l limonene, even more preferably 800 g/l limonene and most preferably at least 900 g/l limonene, expressed as amount of limonene active ingredient with 100% purity relative to the total volume of the composition.

In a preferred embodiment, a composition used in an embodiment of a method according to the invention comprises CIPC and limonene together. These can be both dissolved in a solvent or the CIPC can be dissolved in limonene without the need of a solvent. The advantage of a composition comprising both CIPC and limonene is that the method is reduced to one step, namely the application of the composition comprising CIPC and limonene.

A limonene composition for use in a method according to an embodiment of the invention preferably comprises at least 50% limonene by weight, preferably 55% limonene by weight, more preferably 60% limonene by weight, even more preferably 65% limonene by weight and most preferably at least 70% limonene by weight, expressed versus the total weight of the composition. The high limonene content has the advantage that less volume of composition needs to be shipped and stored compared to a more diluted product.

The amount of active ingredients for treatment is selected to at least partially prevent sprouting of the tubers treated and to remove sprouts that have formed on said tubers.

The amount of CIPC typically used as anti-sprouting agent when used without limonene is maximum 36 g CIPC/ton/year and normally the following doses are used:
 a first application at 3 to 6 weeks in storage with a dose of 6 to 12 g CIPC/ton;
 from the second application onwards every 2 to 3 months, a dose of 6 to 8 g CIPC/ton.

In the present invention, the amount of limonene/CIPC that is applied to the tubers is an amount effective to inhibit sprouting of the tubers. Sprouting inhibition can vary in the present invention from minimal, to some inhibition and to complete inhibition, including all variations there between.

The amount limonene/CIPC that is effective to inhibit sprouting of tubers, in particular of potato tubers, depends on such factors as the composition comprising the limonene and/or CIPC (e.g. neat, diluted, EC) and potentially the potato cultivar being treated. In some embodiments of the methods of the invention the limonene/CIPC applied to the tubers, in particular potato tubers, is in an amount sufficient to provide a dosage of from any measurable amount such as .001 ppm to 50, 100, 200, 500, or 1000 ppm.

The methods of the present invention are applicable to any potato cultivar including, but not limited to, the cultivars Bintje and Innovator.

In a method according to the invention, the ratio of the mass of limonene over the mass of CIPC is higher than 4. In a preferred embodiment, the ratio between the mass of limonene and the mass of CIPC is preferably between 2 and 50, more preferably between 4 and 40, even more preferably between 6 and 30 and most preferably between 8 and 24. This ratio makes sure that the majority of the active ingredients is harmless limonene and strongly reduces the amount of potentially harmful CIPC needed to be effective in the inhibition of sprout formation.

Preferably CIPC is used in an embodiment of a method according to the invention in an amount of max 36 g CIPC per ton of treated tubers. More preferably at most 30 g CIPC is used per ton of treated tubers, even more preferably at most 25 g, 20 g, 15 g, and most preferably at most 12 g CIPC per ton of treated tubers.

Preferably limonene is used in an embodiment of a method according to the invention in a maximum of 1080 g limonene per ton of treated tubers or 12 treatments of 90 g limonene/ton.

In a preferred embodiment, 12 g CIPC is applied at storage in combination with 90 g limonene after nine weeks, followed by 90 g limonene treatments every three weeks. In another preferred embodiment, 12 g CIPC is applied at storage followed by 90 g limonene treatments every three weeks.

The method of treatment according to an embodiment of the invention can provide sprout control for a storage period of up to 4 months, preferably up to 5 months, more preferably up to 6 months, even more preferably up to 7 months, most preferably up to 8 months.

In a preferred embodiment, the application of the composition comprising CIPC is done by fogging. In the process of fogging the composition is volatised by air or any other gas is blown trough the composition leading to droplets distributed in the air or gas. The temperature at what fogging is performed is preferably between 150° C. and 350° C., more preferably between 175° C. and 250° C. This type of application leads to a fog, with droplets with a small diameter and with a more narrow size distribution than cold fogging would. Synonyms for the term "hot fogging" as used herein, are thermal fogging or thermonebulization.

Fogging as used herein refers to the generation of ultra-fine droplets in a range of 1-50 μm using pneumatic energy. Liquid substances are vaporised at the end of a fogging barrel (resonator) and form ultra-fine aerosols by condensing on contact with cool ambient air, on being ejected, to create dense visible fog-clouds.

Orange oil solutions or a limonene emulsifiable concentrate as described for use in an embodiment of the invention are especially suitable for this purpose. The fogging method allows the treatment of relatively large spaces with a minimum quantity of pesticide solution, less operational work and with little harm to the environment, i.e. less residues.

Fogging equipment is known to a person skilled in the art. For instance, for fogging, a pulse jet engine may be used. The pulse jet engine consists of a bottle-shaped combustion chamber similar to a rocket engine which opens into a long exhaust pipe (resonator). An initial mixture of fuel and air is supplied through non-return valves into a combustion chamber and is ignited by a high-tension spark obtained from a battery powered electronic ignition device connected to the plug for a few seconds. The fuel is regular-grade petrol and about 2 l/h is used on the smaller machines. Once the machine has started, the high-tension spark is no longer required and is automatically stopped. The exhaust gases from the combustion chamber escape as a pressure wave at high velocity through a long pipe of smaller diameter than the combustion chamber and draw in a fresh change of fuel and air from the carburettor. In operation, there are about 80-100 pulsations per second. By means of a non-return valve the pesticide tank is also pressurized, preferably with 0.2-0.4 bar, and when the machine has warmed up, typically after about 2 min. running, a valve tap is opened to permit the controlled and regulated flow of solution through interchangeable dosage nozzles, fitted into the end of the resonator. Near the outlet of the resonator, the chemical to be atomised is injected into the hot exhaust gas stream. A part of it gassings, and it condenses to form billions of ultra-fine fog droplets. As a pulse jet engine does not have mechanically moving drive components it is less sensible to wear and tear. It is cost-effective as savings can be realized on repair activities.

In a preferred embodiment, a fogging apparatus is used with two different fogging injection points at the resonator, as it allows the application of two different active ingredients or the combination of small and large droplet sizes, such as limonene and CIPC.

In another preferred embodiment, a fogging apparatus is used that allows not to pre-mix in a chemical tank the limonene/CIPC and water as carrier, but to inject them into the resonator of the apparatus separately, and only mix it at the point where it is atomised. The limonene emulsifiable concentration without water or solvent other than terpenes, is especially suitable for use with this type of apparatus.

For a pulse-jet thermal fogger with separate water addition the advantages are: the water which needs more calories to be evaporated, is injected into the resonator at a point of higher temperature and cools down the hot explosion gases to the so-called water steam temperature of an open system=100° C. The limonene composition is injected at a cooler point and absorbs instead of the original exhaust temperature, a pre-cooled temperature of 100° C. for 0.05-0.1 second which leads to an even lower temperature between 30-40° C. into the mixing area of "Venturi effect". The desired droplet size is controlled by the adjustable flow rate of the injected water. If required, larger and heavier droplet sizes can be produced. Consequently, the technique offers a kind of cold fog application system compared to LV and ULV systems. Another advantage is that the produced water vapour cleans the resonator exhaust pipe and avoids residues of the fogging solution at the end of the pipe. It is further an advantage that the injection of water avoids in any case the inflammation of the oil-based pesticide fog and also reduces the danger of fire next to nothing when the machine is used improperly. Even if the user forgets to close the fog tap when he stops the machine the water injection will avoid an inflammation of the pesticide formulation.

In a preferred embodiment, the application of the composition comprising limonene is done by fogging. This can be cold or hot fogging. Application of limonene is preferably done by hot fogging, such as electrofogging.

In another preferred embodiment, the application of a composition comprising both limonene and CIPC is applied by fogging.

In another embodiment the application of composition comprising limonene and/or the composition comprising CIPC is done by spraying, wetting, dipping, misting, drenching, showering, soaking, dampening, drizzling, dousing, or splashing.

In a preferred embodiment, the method is repeated more than once during storage of tubers, preferably the method is repeated between every week and every 8 weeks, more preferably between every 2 weeks and every 6 weeks, even more preferably every between every 3 weeks and every 4 weeks, most preferably every 3 weeks.

In a preferred embodiment, the first time the method is carried out on tubers, the ratio of the mass of limonene over the mass of CIPC is preferably between 2 and 50, more preferably between 4 and 40, even more preferably between 15 and 30, and most preferably 24.

In a preferred embodiment, from the second time the method is carried out on tubers onward, the ratio of the mass of limonene over the mass of CIPC is preferably between 2 and 50, more preferably between 4 and 30, even more preferably between 6 and 15, and most preferably 8.

A treatment with limonene can be executed with an interval of at most one day before the tubers are offered on the market. Due to its volatility it evaporates within a day. The price of potatoes varies through the storage season and is difficult to predict. When treated with one large amount of CIPC, the potatoes cannot be offered on the market when suddenly the price is high. This is due to the fact that the residue level of CIPC is still too high. Frequent treatments of small doses CIPC followed by limonene will make sure that at any point in time the level of CIPC residue is below the Maximum Residue Level (MRL) and can be offered to the market at any time during the storage season. In this way a better response to market demand and a higher market value can be obtained.

In a preferred embodiment the tubers to be treated are potatoes.

In a preferred embodiment the method will be carried out in a storage chamber. The storage chamber is preferably designed to store tubers, in a way to control the environment and will preferably only house tubers.

In preferred embodiment, the application of the composition comprising limonene is carried out after the application of the composition comprising CIPC. The CIPC will induce a dormant state slowing down the formation of sprouts. CIPC is working as a preventing anti-sprouting agent. The little sprouts that have been formed will be removed by the limonene, which act as a curative anti-sprouting agent.

In another preferred embodiment the application of the composition comprising CIPC is carried out after the application of the composition comprising limonene. The limonene will remove the present sprouts, as limonene works as a curative anti-sprouting agent. The CIPC will than induce a dormant state, resulting in very few sprout formations as CIPC works as a preventive anti-sprouting agent.

In a preferred embodiment, a period of preferably between 0 to 30 days, more preferably between 7 to 21 days and most preferably 14 days, is left between the application of a composition comprising CIPC and the application of a composition comprising limonene. This timing of application provides the most effective results as the sprout are still very small when the limonene is applied.

In another preferred embodiment, the application of CIPC and limonene is carried out at the same time, preferably with the same machine.

A method according to an embodiment of the invention allows to cut the amount of CIPC previously used by at least 10%, preferably 20%, more preferably 30%, even more preferably 40% and most preferably 50%. This can also reduce the residue of CIPC on tuber or potatoes by at least 10%, preferably 20%, more preferably 30%, even more preferably 40% and most preferably 50%.

The present invention will be now described in more details, referring to examples that are not limitative.

Example 1: Preparation of a Limonene Composition for Use in Fogging

A composition suitable for use in cold fogging for the anti-sprouting treatment of tubers, can be prepared as follows. Orange oil, food grade, was selected as a start material. To this terpene oil rich in D-limonene, surfactants were added, in particular a non-ionic and ionic surfactant. It was advantageous to add a limonene anti-oxidant. In the composition illustrated below, butylated hydroxytoluene was selected. No solvent in addition to the orange oil is required.

TABLE 1

| 600 EC orange oil composition, product code BCP425D | | |
|---|---|---|
| Ingredients | g/l | wt/wt % |
| Orange oil | 630 | 71.6 |
| Butylated hydroxytoluene (BHT) | 0.7 | 0.1 |
| Fatty alcohol iso-C13 + 5 EO | 112 | 12.7 |
| Ethanolamine alkylbenzenesulfonate | 137 | 15.6 |
| No additional solvent | | |
| Total | 879.7 | 100 |

Example 2

The Research Potato Storage Facility Design

The storage system was designed to duplicate a large commercial storage facility in miniature. It consisted of 4 test cabins, with room for 4 boxes per level. In total there were 7 levels, and the boxes were placed in a stair-pattern, in clock-wise direction. Each cabin could be used to store up to 560 kg of potatoes per cabin. The dimensions of a cabin are depicted in FIG. 1.

During storage the air temperature within the storage system was kept between 5.0° C. and 9.5° C. The relative humidity was kept between 87% and 100%.

The application equipment used for hot fogging was IGEBA TF-35. The application equipment used for cold fogging was VEUGEN, type: FOGCOL. The operation pressure was 3.3 bar. Cold and hot fogging conditions were similar to those obtained in local storage practice.

Treatment by Fogging

Cabins provided with 560 kg of potatoes were housed in a cooled storage facility. Potatoes of the variety Bintje were used. The potatoes came directly from the trial field. No special grading was done after they were harvested. The quality of the tubers was good and there were no specialties reported. They were harvested on 8 October. After 2 weeks they were put in blue boxes from around 20 kg. They were placed in the 4 test cabins, 4 boxes per level. Every box contained a different object, as follows:

Object 1: Bintje untreated
Object 2: Bintje CIPC (Neonet start 30 ml/ton) (CIPC 300 EC)
Object 3: Innovator untreated
Object 4: Innovator with Himalaya 5 kg (5 kg of maleic hydrazide 600 SG per hectare (foliar application)

In total there were 560 kg of potatoes in each cabin.

Around 15 minutes before treatment, Automatic Regulation was switched off and Manual Internal Ventilation was switched on (Force III). It stimulates intern air circulation. Note: Ventilation Force III means ~900 m³/h.

As the exact weight of tubers in the cell was known, the exact quantity of formulated product was calculated and prepared.

During spraying/fogging and till around 15 minutes after spraying, Internal

Ventilation was kept switched on (Force III) to assure a good contact between product and tubers.

Around 15 minutes after spraying, Internal Ventilation was switched off

The day after (minimum 12 hours after end of spraying) Automatic Regulation was switched on till next application or till end of trial The fogging of the cabins was done by a small hole in de top of the door. The fog was generated outside the cabin and then brought inward. After the cabins were fogged, they were placed back into the refrigerator at 8° C.

At the back of the cabins were tubes with a small fan to provide air circulation in the cabins. Air circulation in the cabins flowed from the bottom to the top. The air circulation was shut off during the 24 hours after treatment.

Between every treatment the fogging nozzle was cleaned and rinsed with hot water. It was set up to spray with hot water, to clean it.

The first fogging application (A) from the cabins was done on 22 October, 2 weeks after harvest. Since that moment there was an interval of 3 weeks until the second and last quotation in May of the next year.

Each cabin was treated according to the condition as listed in the table 1 below.

TABLE 1

Treatment schedule

| | Cabin No1 | Cabin No2 | Cabin No3 | Cabin No4 |
|---|---|---|---|---|
| | | Product | | |
| | Untreated | Neonet 500 HN | BCP425D | Neonet 500 + BCP425D |
| First treatment: 22 Oct. 2012 (2 weeks after harvest) | | | | |
| Dose: ml/cabin | None | 4.2 | 50.4 | 2.1 + 50.4 |
| From second treatment, every 3 weeks starting 12 Nov. 2012 | | | | |
| Dose: ml/cabin | None | 4.2 | 16.8 | 2.1 + 16.8 |

Evaluation

The assessment of the objects was done twice. The first assessment was done March 8 according to the PCA-scale, as provided in Table 2. There was a global number given to the sprouts on the 4th level (middle of the cabins). Results are summarized in FIG. 2.

TABLE 2

Assessment scale

| 1 | No sprouts |
|---|---|
| 2 | Sprouts visible, main sprout at white point stage |
| 3 | Widespread white point |
| 4 | Main sprout >2 mm |
| 5 | All sprouts >2 mm |
| 6 | All sprouts >2 mm, some >20 mm |
| 7 | All sprouts >20 mm |

TABLE 2-continued

Assessment scale

| 8 | Advanced sprouting |
|---|---|
| 9 | Advanced sprouting + forming of roots |

The second assessment was done mid-May. The result is provided in pictures (FIGS. 3-7).

No symptoms of phytotoxicity were noted in the tubers during the various observations.

Results—First Assessment 2013, 3 Aug.

Figure 2:
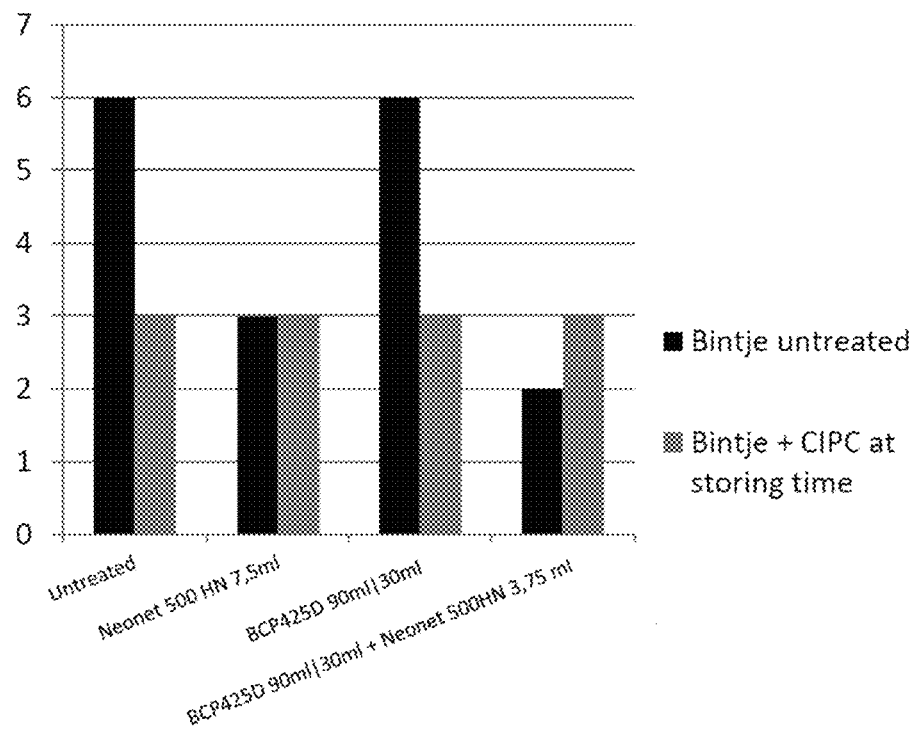
FIG. 2 provides a graphic representation of the sprout index for potatoes from the variety Bintje that were untreated before storage (black) and potatoes that were treated with 30 ml CIPC/ton potatoes before entry in storage (grey). Results are depicted for different fogging regimes.

FIG. 2 provides a graphic representation of the sprout index for potatoes from the variety Bintje that were untreated before storage (black) and potatoes that were treated with 30 ml CIPC/ton potatoes before entry in storage (grey). Results are depicted for 4 treatment cabins. The first cabin was untreated during storage. The second cabin was treated every 3 weeks with CIPC in the Neonet 500 HN formulation via hot fogging at a dose rate of 7.5 ml CIPC/ton potatoes. The third cabin was treated with a limonene composition at an initial dose rate was 90 ml limonene/ton potatoes, from the second treatment onward the dose rate was 30 ml limonene/ton potatoes. The forth cabin was treated with a limonene composition at an initial dose rate of 90 ml limonene/ton potatoes, from the second treatment onward the dose rate was 30 ml limonene/ton potatoes, every treatment in the fourth cabin was combined with an application of CIPC using a Neonet 500 HN formulation at a dose rate of 3.75 ml CIPC/ton potatoes.

From the results it can be seen that a combination of CIPC with limonene allows the reduction of the CIPC dose for follow-on treatments.

Results—Second Assessment 2013 May-Mid-May

FIG. 2 depicts the sprout index for potatoes from the variety Bintje that were untreated before storage (black) and potatoes that were treated with 30 ml/ton CIPC before storage on the roller table (grey). Neonet is a CIPC-formulation, the treatment of potatoes every 3 weeks with CIPC reduced sprout growth, but there is no added effect compared to the potatoes that were treated with CIPC before they enter storage. BCP 425D stands for orange oil, and so for limonene. Limonene at an initial dose rate of 90 ml followed by dose rates of 30 ml, did not have any effect on sprout growth. The same dose rates of limonene in a combination of a treatment with 3.75 ml CIPC in the form of Neonet had been proven to be effective in the inhibition of sprout formation using half of the amount of CIPC to obtain the same or better results than the use of CIPC alone.

Figure 3:
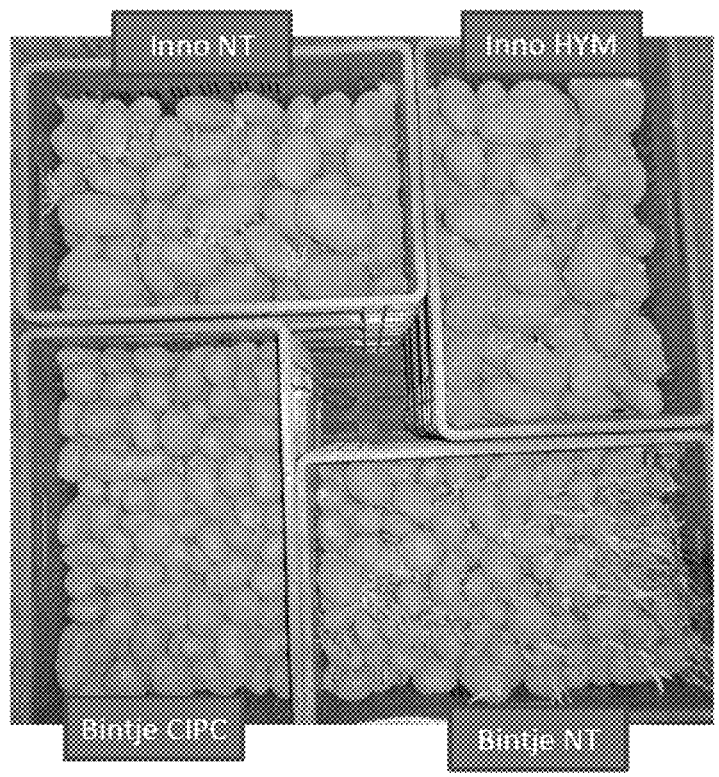
FIG. 3 is a photographic representation of the results in the untreated group.

FIG. 3 shows the 4$^{th}$ level of the potatoes in the first cabin. This cabin was a control, and no active agent was applied after the beginning of storage. Inno NT stands for potatoes from the variety Innovator and are not treated with any active agent before storage. Bintje NT, stands for potatoes from the variety Bintje and are not treated with any active agent before storage. Inno HYM, stands for potatoes from the variety Innovator that are treated with Hymalaya a formulation of maleic hydrazide at a dose rate of 5 kg/hectare. Bintje CIPC, stands for potatoes from the variety Bintje that are treated with 30 ml/ton CIPC before they entered storage.

Figure 4:
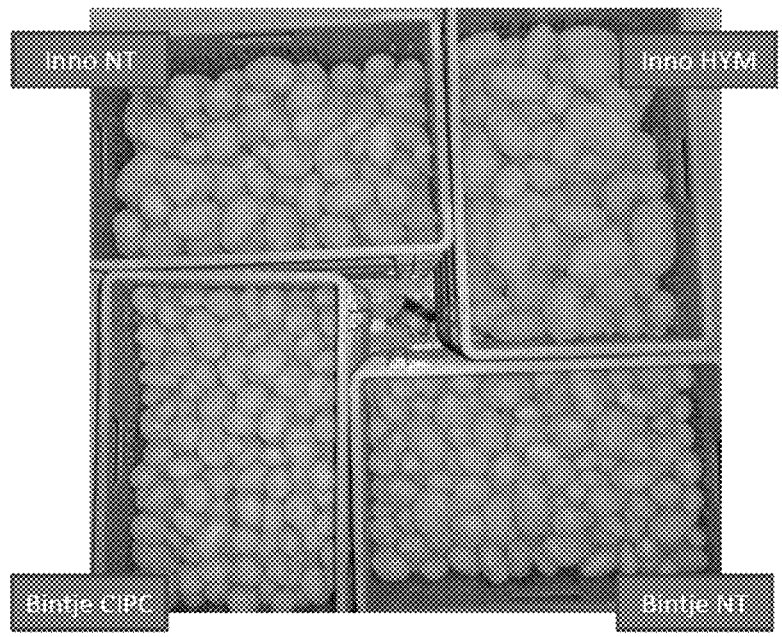
FIG. 4 is a photographic representation of the results obtained in the group receiving a three-weekly treatment with 7.5 ml/1000 kg CIPC using Neonet 500 HN.

FIG. 4 shows the 4$^{th}$ level of the potatoes in the second cabin. To this cabin CIPC was added in the Neonet 500 HN formulation at a dose rate of 7.5 ml/ton. This was repeated every 3 weeks.

Figure 5:
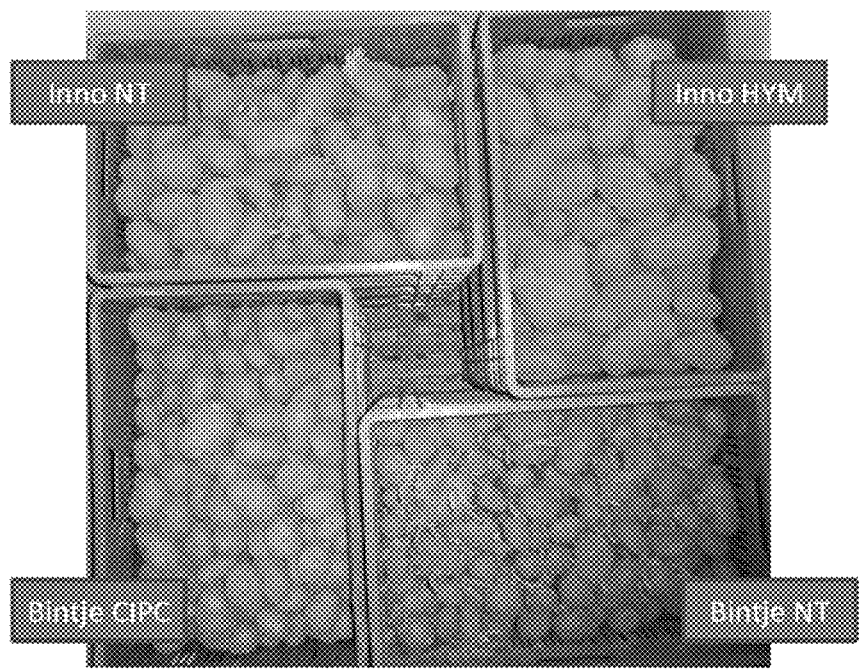
FIG. 5 is a photographic representation of the results obtained in the group receiving a three weekly limonene treatment using the EC-composition of example 1. The initial dose rate was 90 ml limonene/ton potatoes, from the second treatment onward the dose rate was 30 ml limonene/ton potatoes.

FIG. 5 shows the 4$^{th}$ level of the potatoes in the third cabin. To this cabin limonene was added at an initial dose rate of 90 ml/ton, followed by a dose rate of 30 ml/ton. The limonene was added every 3 weeks to this cabin.

Figure 6:
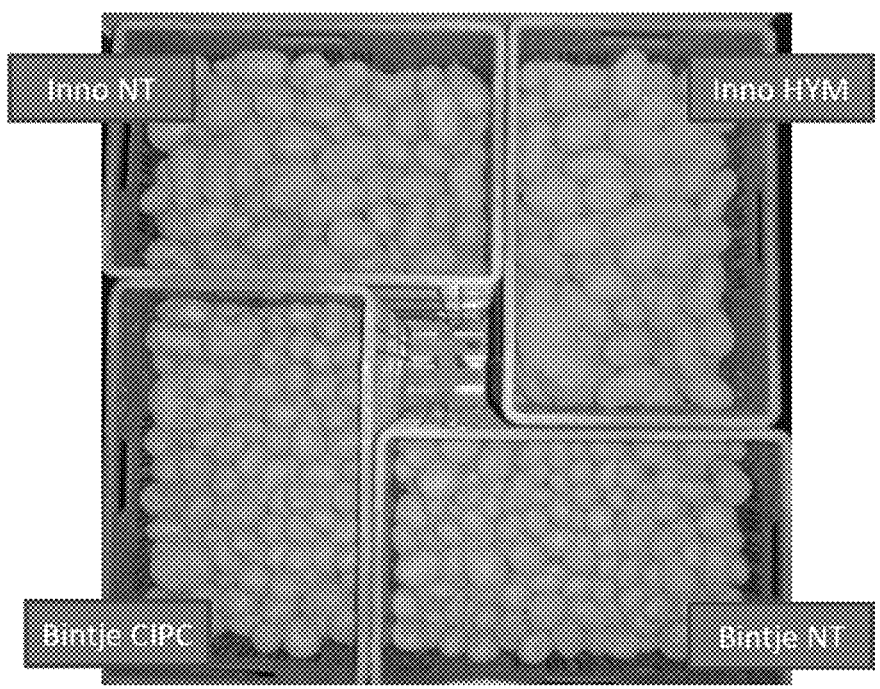
FIG. 6 is a photographic representation of the results obtained in the group receiving a three weekly with 3.75 ml/1000 kg CIPC using Neonet 500 HN, in combination with limonene. Limonene, using the EC-composition of example 1, was applied the first time at a dose of 90 ml/1000 kg, followed by 30 ml/1000 kg in three weekly intervals.

FIG. 6 shows the 4$^{th}$ level of the potatoes in the fourth cabin. To this cabin limonene was added at an initial dose rate of 90 ml/ton, followed by a dose rate of 30 ml/ton. Every limonene application was combined with an application of CIPC in the Neonet formulation at a dose rate of 3.75 ml/ton. The limonene was added every 3 weeks to this cabin.

Results—Internal Sprouts

At each observation date, internals sprouts were also assessed: no presence of representative sprouts was detected in any of the treatments.

Example 3

A comparison was made between a spear mint oil treatment and an orange oil treatment. Spear mint oil treatment was with Biox M, a product formulated for electrofogging based mainly on carvone (65-85%). Orange oil treatment was with BIO 024, an orange oil with elevated content of limonene (at least 900 g limonene/l). A group of treatments was by cold fogging (group A), another group was by hot fogging, in particular by electrofogging. An untreated check was included as well. Treatment conditions (storage temperature, ventilation, humidity, used varieties, loading/unloading/distribution) were the same. Potatoes were harvested on 23 Sep. 2014 and loaded into the experimental chambers on 30 Sep. 2014. The potatoes were dried and then cooled down to 7° C. The first application took place on 21 Oct. 2014.

Figure 7A:
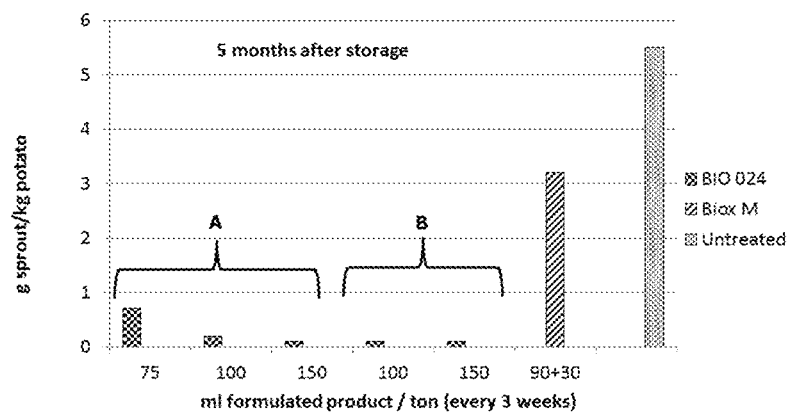
FIG. 7A presents the data obtained 5 months after storage, FIG. 7B provides the data for 6 months after storage.
Figure 7B:
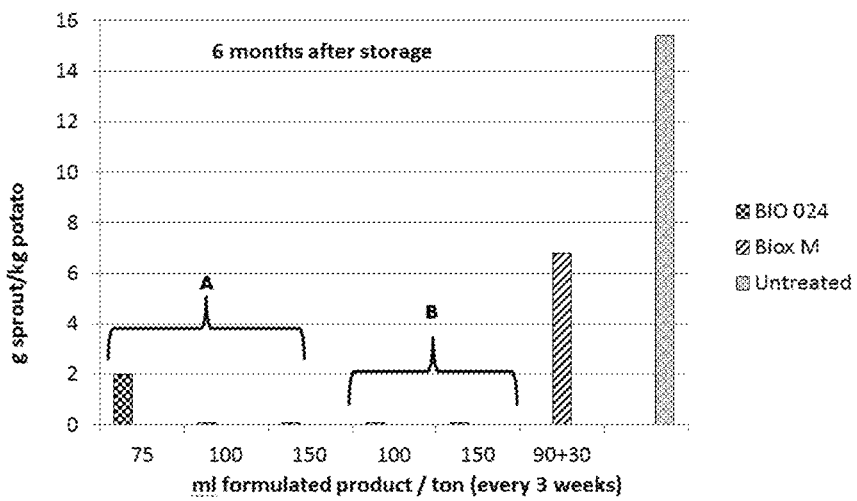
FIG. 7 represents a graphical representation of potato trial results. In the Y-axis sprout weight is presented and expressed in g sprouts/kg potato. In the X-axis the dose rate is represented expressed in ml formulated product per ton of potato, with a treatment interval of every three weeks. The bars with indication A, represent a cold fogging application, the bars with indication B, represent a hot fogging application (electrofog).
FIG. 7C provides the data 7 months after storage.
Figure 7C:
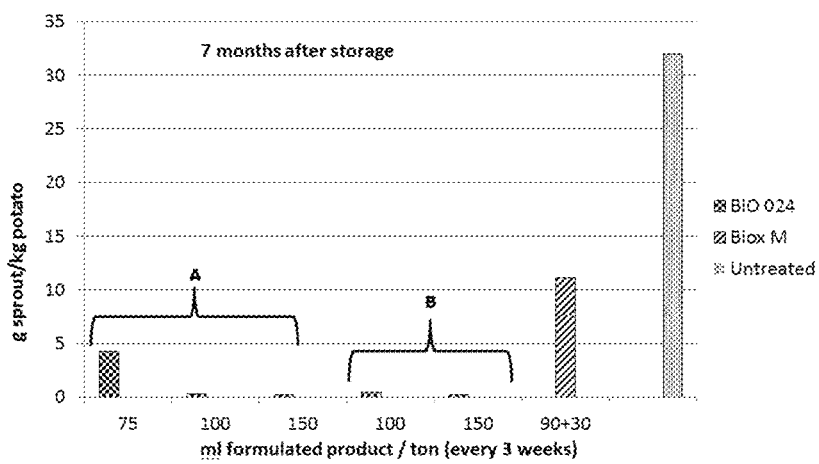

The results are summarized in FIG. 7, for different time periods of storage (FIG. 7A: 5 months after storage, FIG. 7B: 6 months after storage, FIG. 7C: 7 months after storage). Nine orange oil treatments provided between 675 to 1350 ml formulated product per ton (9×75 ml to 9×150 ml formulated product). For Biox-M a first application of 90 ml was followed with 9 times 30 ml applications, providing a total of 310 ml/ton.

From the results it can be concluded that orange oil treatment provided the best sprout growth control. Orange oil works by direct contact. A good spread over the surface of the potato is required to provide homogeneous control. From the figures it can be seen, that this is better obtained by hot than by cold fogging; hot fogging produced smaller droplets hence a better spreading of the product. There was a clear dose response relationship between 75 ml and 100 ml, but not between 100 ml compared to 150 ml. A dose of 100 ml formulated product per ton of potatoes at an interval of 3 weeks provided the best control. Efficacy is believed to be based on a curative effect.

In conclusions, it is demonstrated that orange oil/limonene treatment provided adequate sprout control, even in the absence of prior chemical treatments such as with maleic hydrazide or CIPC, over an extended period of time. It provided better sprout control compared to Biox-M, based on spear mint oil. In addition, it does not leave a mint taste in potatoes processed for the production of fries.

Example 4

Figure 8:
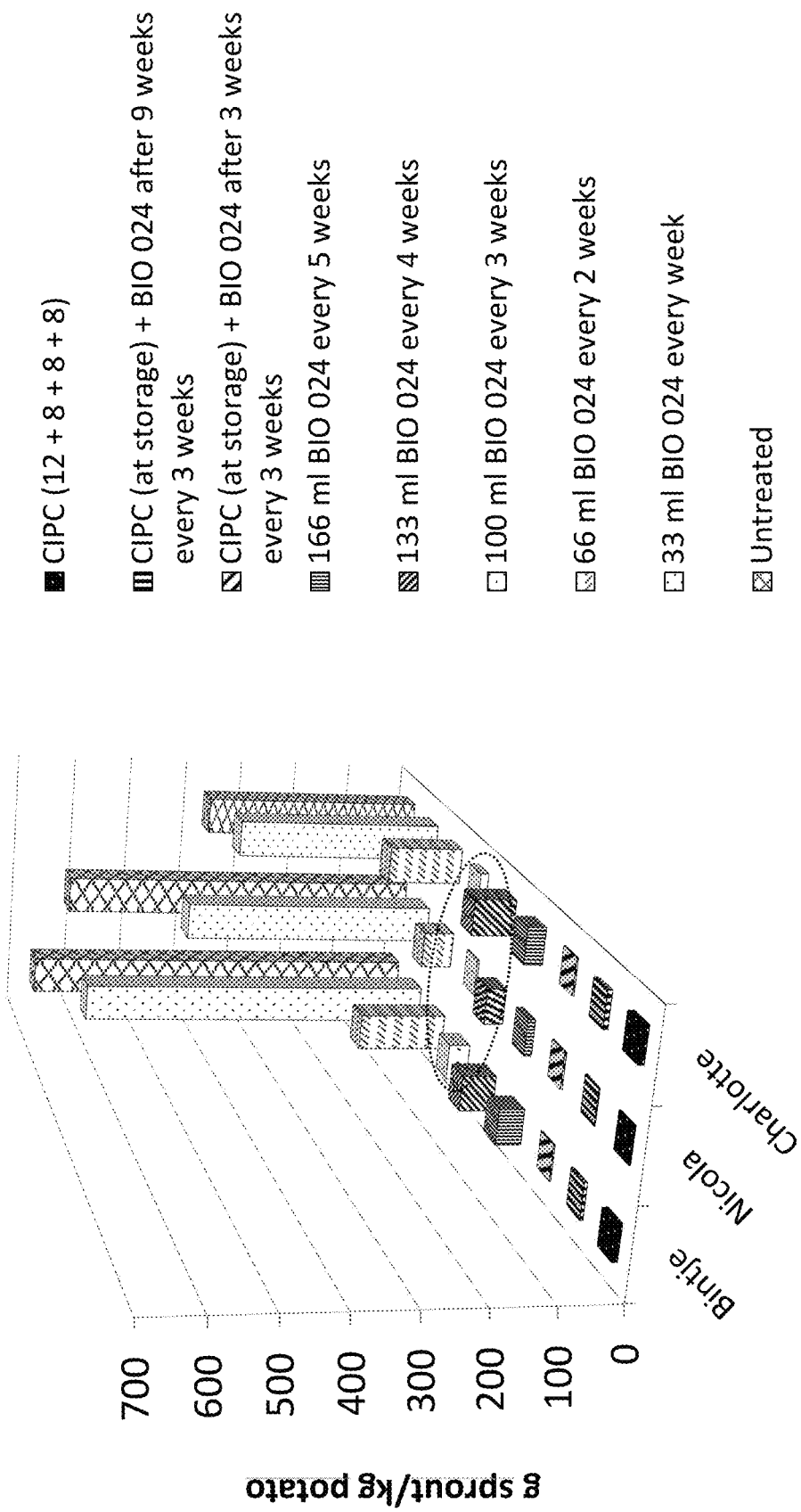
FIG. 8 represents a bar graph presentation of potato trial results obtained by hot fogging application (electrofog). Results are presented for trials on the potato variety Bintje (medium long to long dormancy), Nicola (medium long dormancy), Charlotte (long dormancy). Products used were CIPC or orange oil (BIO024, x % limonene). The dose applied is expressed in ml product/ton. The frequency of application is also provided. In the first CIPC trial, 12 g active ingredient was applied on 5 Nov. 2014, 8 g active ingredient was applied on 31 Dec. 2014, 8 g active ingredient was applied on 25 Feb. 2015, and 8 g active ingredient was applied on 22 Apr. 2015, 2: CIPC (at storage)+BIO024 after 9 weeks every 3 weeks, 3: CIPC (at storage)+BIO 024 after 3 weeks every 3 weeks, 4: 166 ml BIO 024 every 5 weeks, 5: 133 ml BIO 024 every 4 weeks, 6: 100 ml BIO 024 every 3 weeks, 7: 66 ml BIO 024 every 2 weeks, 8: 33 ml BIO 024 every week, 9: untreated. The results were recorded 5 months after storage.

An evaluation was conducted of several timings of application of Bio024 (940 g/l orange oil) on the potato varieties Bintje, Charlotte and Nicola, by hot fogging. The results are summarized in FIG. 8.

As references an untreated check was included, as well as treatments with CIPC 500 HN (500 g/l chlorpropham). The treatments have the same total dose of active substance. The dose rate per application is adapted accordingly to the frequency of application used. Four replications were made. The air temperature per unit was 8.3-10.4° C., % relative humidity was 90% at the start of the trial and 99% during the trial.

In a first trial a treatment schedule based on CIPC alone was used. Twelve grams active ingredient were applied on 5 Nov. 2014, followed by 8 g active ingredient applied on 31 Dec. 2014, 8 g active ingredient applied on 25 Feb. 2015, and 8 g active ingredient on 22 Apr. 2015, In total the maximum allowed amount of 36 g per ton of potato per year was applied, by means of 4 treatments.

In a second trial, 24 ml CIPC formulated product was applied at storage, corresponding to 12 g active ingredient. Nine weeks after storage 100 ml BIO 024 was applied, corresponding to 90 g limonene. This was followed by 100 ml BIO 024 treatments every 3 weeks. This corresponded to 6 treatments in total. In a third trial, 24 ml CIPC formulated product was applied at storage. 100 ml BIO 024 was applied 3 weeks after storage, followed by 100 ml BIO 024 treatments every 3 weeks. This corresponded to 8 treatments in total.

In a fourth trial 166 ml BIO 024 was applied every 5 weeks, in total 6 treatments. In a fifth trial 133 ml BIO 024 was applied every 4 weeks, corresponding to 7 treatments. In a sixth trial 100 ml BIO 024 was applied every 3 weeks, corresponding to 9 treatments. In a seventh trial 66 ml was applied every 2 weeks, in total 14 treatments. In an eight trial 33 ml BIO 024 was applied every week, in total 27 treatments. In a ninth trial, no treatment was made.

From the results it can be seen that the dosage regime of 100 ml BIO 024, or 90 g limonene, every 3 weeks, provides the best sprout control, when the product is used alone. Delivery of the same amount of active ingredient by means of a smaller single dose and shorter application frequency (e.g. 33 ml BIO 024 every week) or by means of a higher single dose and longer application frequency (e.g. 133 ml BIO 024 every 4 weeks) decreased efficacy of the product used solo.

A combination of CIPC at reduced dose (12 g active ingredient) with orange oil (active ingredient limonene) in 100 ml treatments, provided similar control compared to the CIPC application scheme that is in use today (12 g dose followed by three applications of 8 g, providing a total amount of 36 g active ingredient per ton of potatoes). Due to its volatility and absence of systemic effect, limonene does not contribute to residue findings. With this scheme, the amount of CIPC can be reduced while keeping the efficacy of sprout control. With a CIPC use at storage, the duration between CIPC application and removing the potatoes out of storage is long enough for reduction of the CIPC residue to levels that are even acceptable for the fresh produce market segment.

The invention claimed is:

1. A composition comprising limonene and 3-chlorophenylisopropylcarbamate (CIPC), wherein the limonene is present in an amount from 500 to 750 g/L limonene, and the CIPC is present in an amount such that the weight ratio of limonene to CIPC is higher than 4.

2. The composition according to claim 1, comprising less than 10 wt % solvent.

3. The composition according to claim 1, comprising less than 5 wt % water.

4. The composition according to claim 1, wherein limonene is in the form of an essential oil.

5. The composition according to claim 4, wherein the essential oil is selected from citrus oil, orange oil, lemon oil, lime oil, grapefruit oil, and tangerine oil.

6. The composition according to claim 5, wherein the essential oil is orange oil.

7. The composition according to claim 1, wherein the composition is an emulsifiable concentrate.

8. The composition as claimed in claim 1, wherein limonene is selected from an enantiomeric pure form of D-limonene, an enantiomeric pure form of L-limonene, or a racemic mixture.

9. The composition according to claim 1, comprising more than 50% limonene.

10. The composition according to claim 1, comprising an antioxidant for limonene, said antioxidant selected from diphenylamine, ethoxyquin, 2,6-di-tert-butyl-p-cresol (BHT), ascorbic acid, a tocopherol, a polyphenol, a mixture of 3-t-butyl-4-hydroxyanisole and 2-t-butyl-4-hydroxyanisole (BHA), or a combination of any of the foregoing.

11. The composition according to claim 10, wherein the BHA is a mixture of 3-t-butyl-4-hydroxyanisole and 2-t-butyl-4-hydroxyanisole.

12. The composition according to claim 1, comprising about 12 g of CIPC in a 100 ml treatment composition.

13. The composition according to claim 1, comprising one or more emulsion stabilizing surfactants.

14. An anti-sprouting method for treating tubers, comprising applying to the tubers a composition comprising limonene in an amount from 500 to 750 g/L in the presence of CIPC in an amount such that the ratio of amounts of limonene over CIPC is between 4 to 50.

15. A tuber characterized by low levels of CIPC, which is lower than 10 ppm of CIPC, wherein the tuber is obtained by treatment with a composition comprising limonene and CIPC, wherein the limonene is present in an amount from 500 to 750 g/L limonene, and the CIPC is present in an amount, such that the weight ratio between the amount of limonene and CIPC is between 4 to 50.

16. The tuber according to claim 15, wherein said tuber is a potato, a sweet potato, a cassava, a yam, or a dahlia tuber.

* * * * *